United States Patent [19]
Chung

[11] Patent Number: 5,618,244
[45] Date of Patent: Apr. 8, 1997

[54] SYSTEM FOR ADJUSTING THE WORKING RANGE OF A DAMPER CLUTCH IN AN AUTOMATIC TRANSMISSION

[75] Inventor: Woo-Won Chung, Kyungki-do, Rep. of Korea

[73] Assignee: Hyundai Motor Company, Rep. of Korea

[21] Appl. No.: 533,747

[22] Filed: Sep. 26, 1995

[30] Foreign Application Priority Data

Sep. 27, 1994 [KR] Rep. of Korea ............ 94-24310

[51] Int. Cl.$^6$ ........................... B60K 41/02
[52] U.S. Cl. ........................... 477/169
[58] Field of Search ........................... 477/169, 175

[56] References Cited

U.S. PATENT DOCUMENTS 5,213,186  5/1993  Murata ........................... 477/169

Primary Examiner—Dirk Wright
Attorney, Agent, or Firm—Finnegan, Henderson, Farabow, Garrett, & Dunner, L.L.P.

[57] ABSTRACT

Disclosed is a system for adjusting the working range of a damper clutch with reference to a linear function representing the relationship between the throttle valve position and the revolution per minute (rpm) of the engine in an automatic transmission of a vehicle, which includes a throttle valve position sensor for sensing the amount of opening of the throttle valve to generate an electrical position sensor signal, an engine rpm sensor for sensing the engine rpm to generate an electrical engine rpm signal, and a controller for changing the slope of the linear function according to the electrical position sensor signal and engine rpm signal by detecting the working of supplementary systems mounted in the vehicle for a driver's convenience.

10 Claims, 4 Drawing Sheets

SYSTEM FOR ADJUSTING THE WORKING RANGE OF A DAMPER CLUTCH IN AN AUTOMATIC TRANSMISSION

BACKGROUND OF THE INVENTION (1) Field of the Invention

The present invention concerns a system for adjusting the working range of a damper clutch in an automatic transmission of a vehicle according to the load applied to the engine and the driving habit of a driver.

(2) Description of the Prior Art

Generally, the automatic transmission suffers an inferior fuel consumption rate, which is about 10% lower than that of the manual transmission, because the power of the engine is indirectly transmitted by means of a hydraulic pressure. Namely, the power loss is caused by the fluid slip of the torque converter in about 70%, mechanical drive in about 15%, and the slip of the clutch and band in the remaining part. The damper clutch is used to directly connect the pump of the torque converter with the turbine above a given vehicle speed in order to reduce the power loss due to the fluid slip, thus improving the fuel consumption rate as well as quietness.

The working range of the damper clutch is conventionally set with reference to the throttle valve position and the rpm (revolution per minute) of the engine. Especially, when the damper clutch is set to work in a lower shift phase, it works always from the lower shift phase regardless of the engine load. However, in this case, the acceleration of the vehicle becomes less effective because of the damper clutch directly connecting the pump of the torque converter with the turbine. Additionally, if the working range of the damper clutch is set to be wide without considering the engine load caused by various systems equipped in the vehicle, the drive capability may be deteriorated.

SUMMARY OF THE INVENTION

It is an object of the present invention to provide a system and process for adjusting the operating range of a damper clutch according to engine load and/or driving habits.

According to the present invention, a system for adjusting working range of a damper clutch reference for an automatic transmission of a vehicle according to a linear function representing the relationship between the throttle valve position and the revolution per minute (rpm) of the engine in an automatic transmission of a vehicle, comprises:

a throttle valve position sensor for sensing the amount of opening amount of the throttle valve to generate an electrical position sensor signal;

an engine rpm sensor for sensing the engine rpm to generate an electrical engine rpm signal, and a controller for changing the slope of the linear function according to the opening amount of the throttle valve, the engine rpm signal by detecting the working of supplementary systems mounted in the vehicle for a driver's convenience.

According to one aspect of the present invention, there is provided a process for adjusting the working range of a damper clutch for an automatic transmission of a vehicle according to a linear function representing the relationship between the throttle valve position and the engine rpm in an automatic transmission of a vehicle, which comprises the steps of:

detecting operation of supplementary systems mounted in a vehicle for a driver's convenience to generated supplementary working signals to indicate the amount of load applied to the engine; and changing the slope of the linear function according to the amount of load.

According to another aspect of the present invention, a system for adjusting the working range of a damper clutch for an automatic transmission of a vehicle according to a linear function representing the relationship between the throttle valve positionand the revolution per minute (rpm) of the engine in an automatic transmission of a vehicle, comprises:

a throttle valve position sensor for sensing the amount of opening of the throttle valve to generate an electrical position sensor signal; and a shift controller for classifying the throttle valve positions into a first, a second, and a third zone respectively indicating a low, a medium, and a high speed, detecting the throttle valve position in a predetermined interval to determine in which one of the three zones is positioned the throttle valve to find out the frequencies of the throttle valve position appearing in the three zones during the predetermined interval, selecting the greatest frequency to determine one of the three zones as the zone to work the damper a most frequent zone, and controlling the damper clutch to operate in a low, medium, or high shift phase depending on the most frequent zone.

According to a further aspect of the present invention, there is provided a process for adjusting the working range of a damper clutch for an automatic transmission of a vehicle according to a throttle valve position, which comprises the steps of:

classifying the throttle valve positions into a first, a second, and a third zone respectively indicating a low, a medium, and a high speed;

assigning a counter parameter to each of the three zones;

detecting the throttle valve position in a predetermined interval to determine in which one of the three zones is positioned the throttle valve to find out the frequencies of the throttle valve position appearing in the three zones during the predetermined interval;

checking out whether the predetermined interval elapses;

selecting the greatest frequency to determine one of the three zones as the zone to work the damper clutch;

determining whether a frequency of the most frequent zone exceeds a predetermined value required to change the working range of the damper clutch; and setting the damper clutch to work in the low, medium, or high shift phase according to one of the three zones represented by the greatest frequency.

The present invention will now be described with reference to the drawings attached only by way of example.

DETAILED DESCRIPTION OF THE PREFERRED EMBODIMENTS

Figure 1:
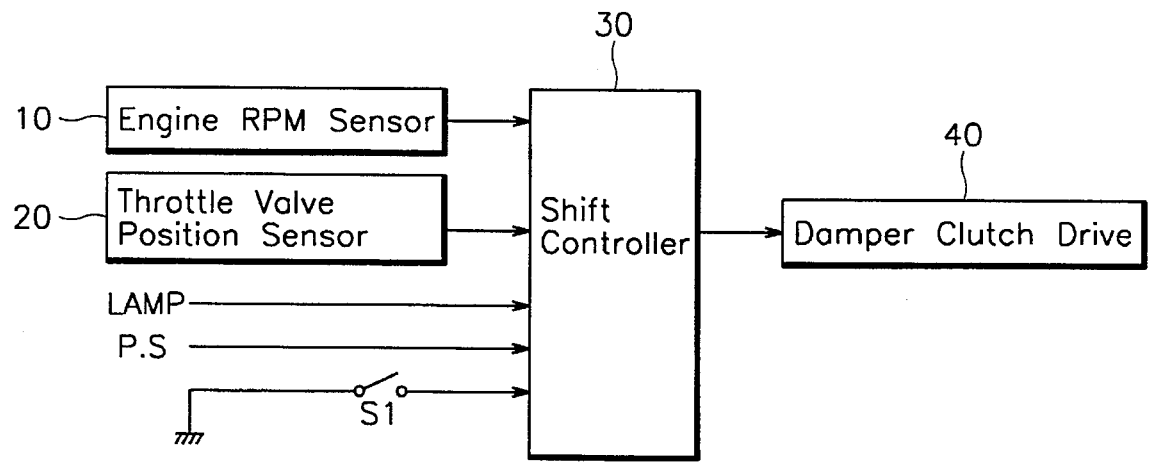
FIG. 1 is a block diagram for schematically illustrating a system for adjusting the working range of a damper clutch according to the present invention.

Referring to FIG. 1, a system for adjusting the working range of a damper clutch includes a shift controller 30 for working a damper clutch drive 40 according to the signals of an engine rpm sensor 10, a throttle position sensor 20, a lamp system, a power steering device PS, and an air conditioner S1.

The process for determining the amount of the engine load starts with the shift controller 30 initializing the parameters of all the circuits in step S110. Then, the shift controller 30 checks out through the steps S120 to S140 whether the supplementary systems such as the lamp system, power steering device, and air conditioner are worked or not. Reference numeral S1 indicates the on/off switch of the air conditioner.

Figure 2A:
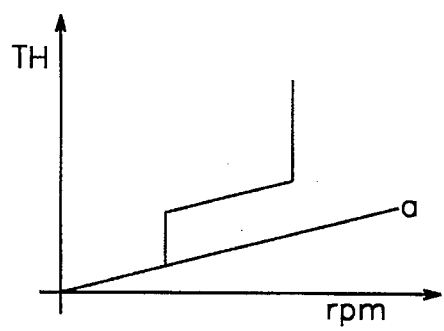
FIGS. 2A and 2B are graphs for illustrating the working range of a damper clutch derived by using the inventive method.
Figure 2B:
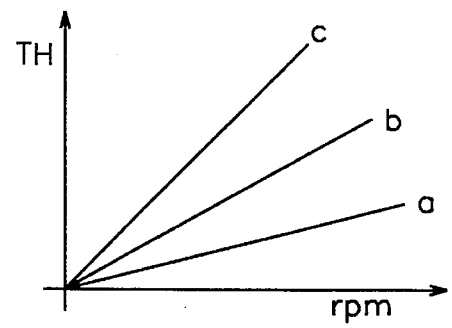
Figure 3:
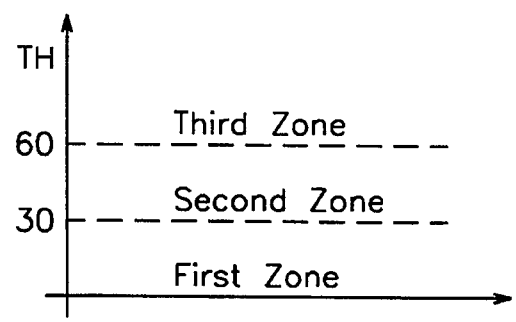
FIG. 3 is a graph for illustrating the throttle valve positions to define the working range of the damper clutch according to the present invention.
Figure 4:
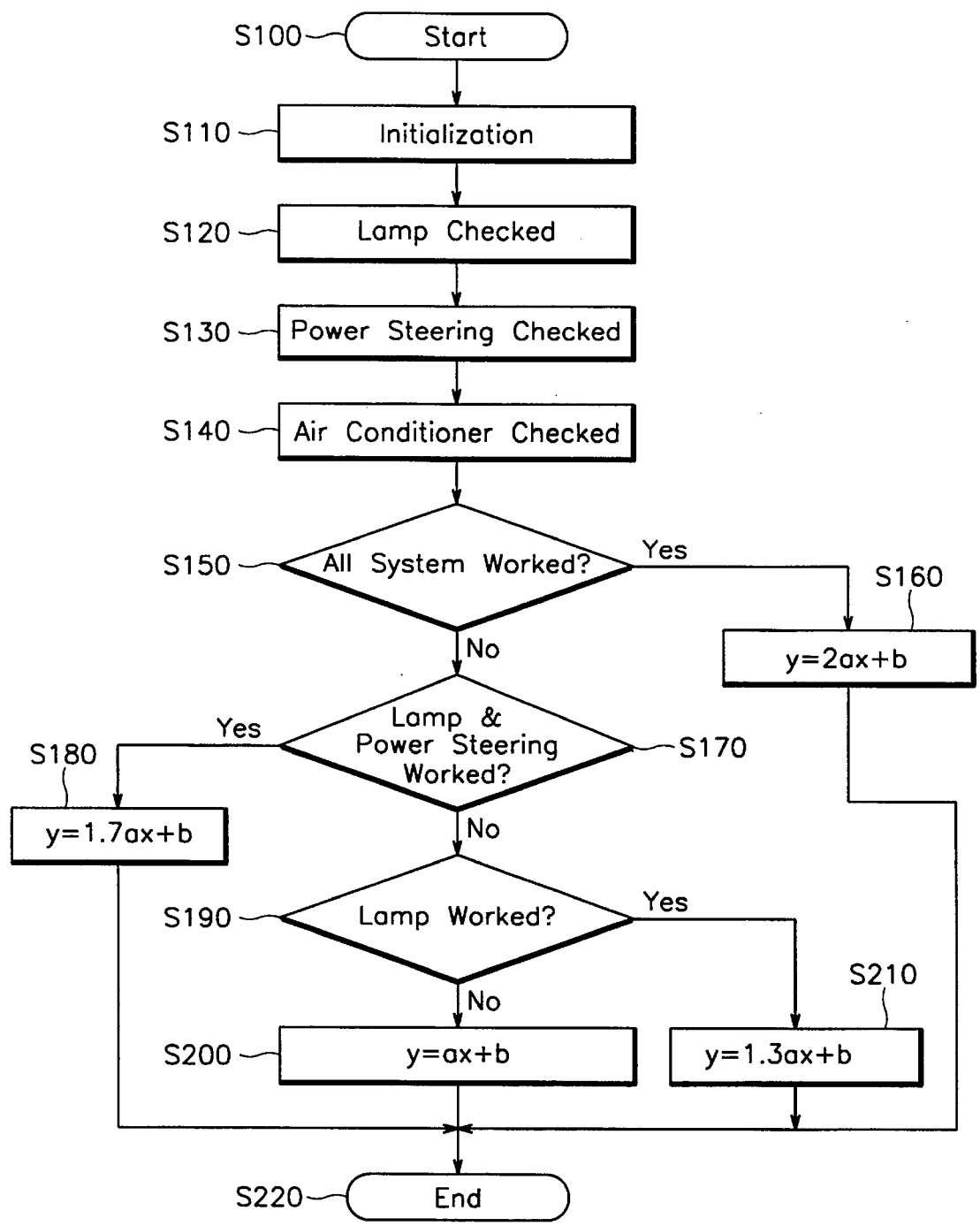
FIG. 4 is a flow chart illustrating the process for determining the amount of the engine load required to control the working range of the damper clutch according to the present invention.

Meanwhile, the rpm may be represented as a linear function of the throttle valve position. Hence, if we assume that the linear function for representing the reference line for working the damper clutch without working any supplementary system be y=ax+b, which is shown as line "a" in FIG. 2, the slope "a" of the function will increase with the increase of the number of the supplementary systems worked. Of course, the values of the coefficients are experimentally obtained. In this context, with reference to FIG. 4, when all the supplementary systems are worked, the linear function is found to be y=2ax+b in step S160. Likewise, when the lamp system and power steering device are worked, the linear function is found to be y=1.7ax+b in step S180. Finally, when only the lamp system is worked, the linear function is found to be y=1.3ax+b in step S210. Thus, the working range of the damper clutch is changed according to the engine load.

Figure 5A:
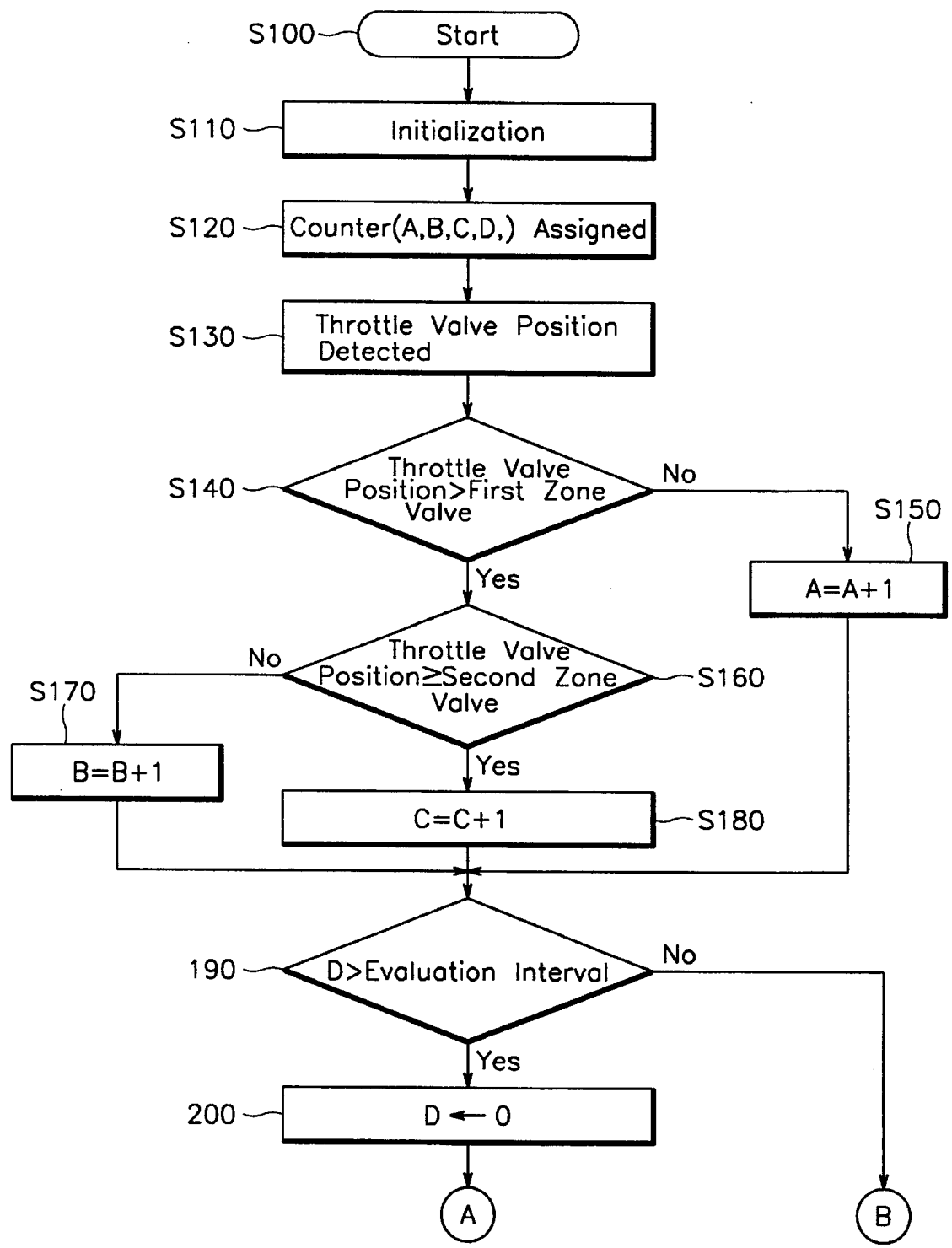
FIGS. 5A and 5B are a flow chart for illustrating the process for controlling the working range of the damper clutch according to the present invention.
Figure 5B:
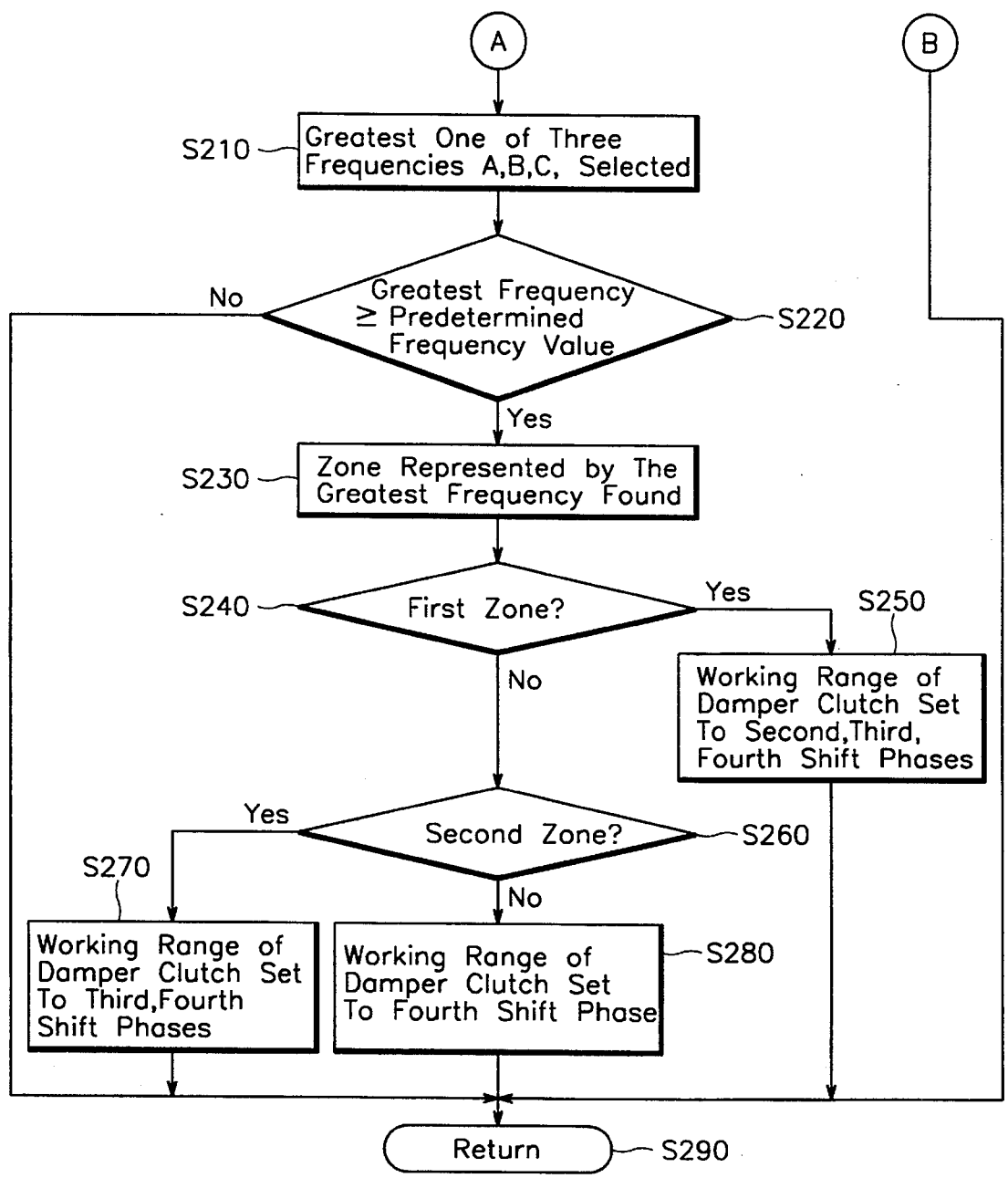

With reference to FIGS. 5A and 5B, there is described the inventive system for adjusting the working range of a damper clutch. The shift controller 30 executes a routine for setting the damper clutch to work in a shift phase fitting the drive habit of a driver. To this end, the throttle valve positions TH are firstly classified into three zones, of which the first zone is determined to indicate the opening of the throttle valve by 30%, the second zone between 30% and 60%, and the third zone more than 60%.

Then, in step S120, the first zone is assigned a counter A, the second zone a counter B, and the third zone a counter C. Additionally established is a counter D to set an evaluation interval during which the frequency of the three zones is evaluated. In step S130, the throttle valve position is detected to determine in which one of the three zones is positioned the throttle valve. Thus, if the throttle valve position is in the first zone or within the 30% opening in step S140, the counter A is increased by +1 in step S150 in order to evaluate the frequency of the first zone. Otherwise, if the throttle valve position is outside the first zone, a decision is made to know whether or no it is in the second zone or within the 60% opening in step S160. If being within the second zone, the counter B is increased by +1 in step S170 in order to evaluate the frequency of the second zone. Otherwise, the throttle valve position is in the third zone, and therefore the counter C is increased by +1 in step S180 in order to evaluate the frequency of the third zone.

Then, the shift controller 30 checks out whether the evaluation time has elapsed in step S190. If the evaluation time has not elapsed, the process is returned to the step S130. Otherwise, the counter D is initialized, and the greatest one of the three frequencies is selected to compare with a predetermined frequency value in steps S200 and S210. If the greatest frequency is found to not exceed the predetermined frequency value in step S220, the drive habit of the driver is decided to have the ordinary mode to which the working range of the damper clutch has been set, and therefore the process is returned to the main routine. Otherwise, it is found out in step S230 which zone the greatest frequency represents.

If the greatest frequency is found to represent the first zone in step 240, the driver is decided to have a drive habit of a regular speed mode, and therefore the working range of the damper clutch is set to the second, third, fourth shift phases in step S250. Namely, a driver having a drive habit of a moderate speed hardly applies an abrupt acceleration or a high speed, and therefore, it is desirable for the damper clutch to work from the lower shift phase in order to improve the fuel consumption rate.

Likewise, if the greatest frequency is found to represent the second zone in step 260, the working range of the damper clutch is set to the third, fourth shift phases in step S270. Or otherwise, the working range of the damper clutch is set to the fourth shift phase in step S280. Namely, if the driver's drive habit is a high speed running, and the damper clutch is set to work from the lower shift phase, the driver's drive habit does not accommodate to the working mode of the damper clutch, and therefore it is desirable to set the damper clutch to the fourth shift phase in such high speed running.

Finally, the shift controller 30 controls the damper clutch drive to work the damper clutch (not shown) according to the throttle valve position and engine rpm.

As described above, according to the present invention, the working range of the damper clutch may be changed according to the driver's drive habit and the load applied to the engine, so that the fuel consumption may be improved and an effective means is provided to accommodate the working range of the damper clutch to the driver's drive habit.

What is claimed is:

1. A system for adjusting working range of a damper clutch for an automatic transmission of a vehicle according to a linear function representing a relationship between position of a throttle valve and revolutions per minute (rpm) of an engine, comprising:

a throttle valve position sensor for sensing opening amount of the throttle valve;

an engine rpm sensor for sensing the engine rpm; and a controller for changing slope of the linear function according to the opening amount of the throttle valve, the engine rpm, and operation of supplementary systems mounted in the vehicle for a driver's convenience.

2. A system for adjusting working range of a damper clutch as recited in claim 1, wherein, if all of the supplementary systems such as a lamp system, power steering system, and air conditioning system are not operating, the controller defines the linear function according to the following equation:

$$y=ax+b$$

where y is the position of the throttle valve, x is the engine rpm, a is the slope of the function, and b is a predetermined coefficient.

3. A system for adjusting working range of a damper clutch as recited in claim 2, wherein the controller increases the slope of the linear function according to the number of the supplementary systems operating.

4. A process for adjusting working range of a damper clutch for an automatic transmission of a vehicle according to a linear function representing a relationship between a throttle valve position and revolutions per minute (rpm) of an engine, comprising the steps of:

detecting operation of supplementary systems mounted in a vehicle for a driver's convenience to determine amount of load applied to the engine; and changing slope of the linear function according to the amount of load.

5. A process for adjusting working range of a damper clutch as recited in claim 4, wherein, if all of the supplementary systems such as a lamp system, power steering system, and air conditioning system are not operating, the linear function is defined according to the following equation:

$$y=ax+b$$

where y is the position of the throttle valve, x is the engine rpm, a is the slope of the function, and b is a predetermined coefficient.

6. A process for adjusting working range of a damper clutch as recited in claim 5, wherein the slope of the linear function increases according to the number of the supplementary systems operating.

7. A system for adjusting working range of a damper clutch for an automatic transmission of a vehicle according to a throttle valve position, comprising:

a throttle valve position sensor for sensing opening amount of a throttle valve; and a shift controller for classifying the throttle valve position into a first, a second, and a third zone respectively corresponding to a low, a medium, and a high speed, the shift controller monitoring the throttle valve position during a predetermined interval to determine from the three zones a most frequent zone, and controlling the damper clutch to operate in a low, medium, or high shift phase depending on the most frequent zone.

8. A system for adjusting working range of a damper clutch as recited in claim 7, wherein the shift controller controls the damper clutch to operate in the second, third, and fourth shift phases if the most frequent zone is the first zone, the shift controller controlling said damper clutch to operate in the third and fourth shift phases if the most frequent zone is the second zone, and the shift controller controlling the damper clutch to operate in the fourth shift phase if the most frequent zone is the third zone.

9. A process for adjusting working range of a damper clutch for an automatic transmission of a vehicle according to a throttle valve position, comprising the steps of:

classifying the throttle valve position into a first, a second, and a third zone respectively corresponding to a low, a medium, and a high speed;

assigning a counter parameter to each of the three zones;

detecting the throttle valve position during a predetermined interval to determine from the three zones a most frequent zone;

determining when the predetermined interval elapses;

determining whether a frequency of the most frequent zone exceeds a predetermined value required to change the working range of the damper clutch; and setting the damper clutch to operate in a low, medium, or high shift phase according to the most frequent zone.

10. A process for adjusting working range of a damper clutch as recited in claim 9, wherein the damper clutch operates in the second, third, and fourth phases if the most frequent zone is the first zone, the damper clutch operates in the third and fourth shift phases if the most frequent zone is the second zone, and the damper clutch operates in the fourth shift phase if the most frequent zone is the third zone.

\* \* \* \* \*